US008963830B2

(12) United States Patent
Akutsu et al.

(10) Patent No.: US 8,963,830 B2
(45) Date of Patent: Feb. 24, 2015

(54) OPERATION SUPPORT SYSTEM, IN-VEHICLE APPARATUS AND PORTABLE TERMINAL

(75) Inventors: Daigo Akutsu, Gifu (JP); Takeshi Kawashima, Nisshin (JP)

(73) Assignee: Denso Corporation, Kariya (JP)

( * ) Notice: Subject to any disclaimer, the term of this patent is extended or adjusted under 35 U.S.C. 154(b) by 262 days.

(21) Appl. No.: 13/400,260

(22) Filed: Feb. 20, 2012

(65) Prior Publication Data
US 2012/0212461 A1 Aug. 23, 2012

(30) Foreign Application Priority Data

Feb. 21, 2011 (JP) ................. 2011-034756

(51) Int. Cl.
*G06F 3/01* (2006.01)
*G06F 3/041* (2006.01)
(52) U.S. Cl.
CPC ...................... *G06F 3/041* (2013.01)
USPC ........... 345/156; 345/157; 701/36; 455/569.2
(58) Field of Classification Search
CPC ......... G06F 3/0362; G06F 3/016; G06F 3/02; G01C 21/36; G01C 21/3688
See application file for complete search history.

(56) References Cited

U.S. PATENT DOCUMENTS

| | | | | |
|---|---|---|---|---|
| 5,805,139 A | * | 9/1998 | Uehara ..................... | 345/156 |
| 2002/0109668 A1 | * | 8/2002 | Rosenberg et al. ........... | 345/156 |
| 2003/0156097 A1 | | 8/2003 | Kakihara et al. | |
| 2007/0203646 A1 | * | 8/2007 | Diaz et al. ..................... | 701/213 |
| 2009/0076676 A1 | | 3/2009 | Yamamoto et al. | |
| 2009/0284467 A1 | | 11/2009 | Itoh et al. | |
| 2010/0134242 A1 | | 6/2010 | Ohta et al. | |
| 2010/0207882 A1 | * | 8/2010 | Bruneau et al. ............... | 345/161 |
| 2011/0205157 A1 | * | 8/2011 | Walline et al. ................. | 345/158 |

FOREIGN PATENT DOCUMENTS

| | | |
|---|---|---|
| JP | 2000-322196 | 11/2000 |
| JP | 2001-249023 | 9/2001 |
| JP | 2003-121157 | 4/2003 |
| JP | 2003-244343 | 8/2003 |
| JP | 2004-224202 | 8/2004 |
| JP | 2008-108062 | 5/2008 |

(Continued)

OTHER PUBLICATIONS

Office Action issued Jan. 15, 2013 in corresponding Japanese Application No. 2011-034756 with English translation.

(Continued)

*Primary Examiner* — Kathy Wang-Hurst
*Assistant Examiner* — Jose Soto Lopez
(74) *Attorney, Agent, or Firm* — Harness, Dickey & Pierce, PLC

(57) ABSTRACT

A portable terminal receives a user operation on a terminal screen of the portable terminal in a portable terminal normal mode. After receiving the user operation, the portable terminal shifts from a portable terminal normal mode to a portable terminal in-operation state, in which the portable terminal sends out a portable terminal in-operation notice to an in-vehicle apparatus. The in-vehicle apparatus shifts to a portable terminal in-operation mode upon receiving the notice from the portable terminal, and invalidates a reaction force by a reaction force generation unit to transit to a portable terminal normal state.

14 Claims, 8 Drawing Sheets

(56) References Cited

FOREIGN PATENT DOCUMENTS

| | | |
|---|---|---|
| JP | 2009-076047 | 4/2009 |
| JP | 2009-276993 | 11/2009 |
| JP | 2010-095027 | 4/2010 |
| JP | 2010-130551 | 6/2010 |
| WO | WO 2010/043944 | 4/2010 |

OTHER PUBLICATIONS

Office Action dated Oct. 29, 2013 in corresponding Japanese Application No. 2011-034756.
Office Action dated May 27, 2014 in corresponding Japanese Application No. 2011-034756.

* cited by examiner

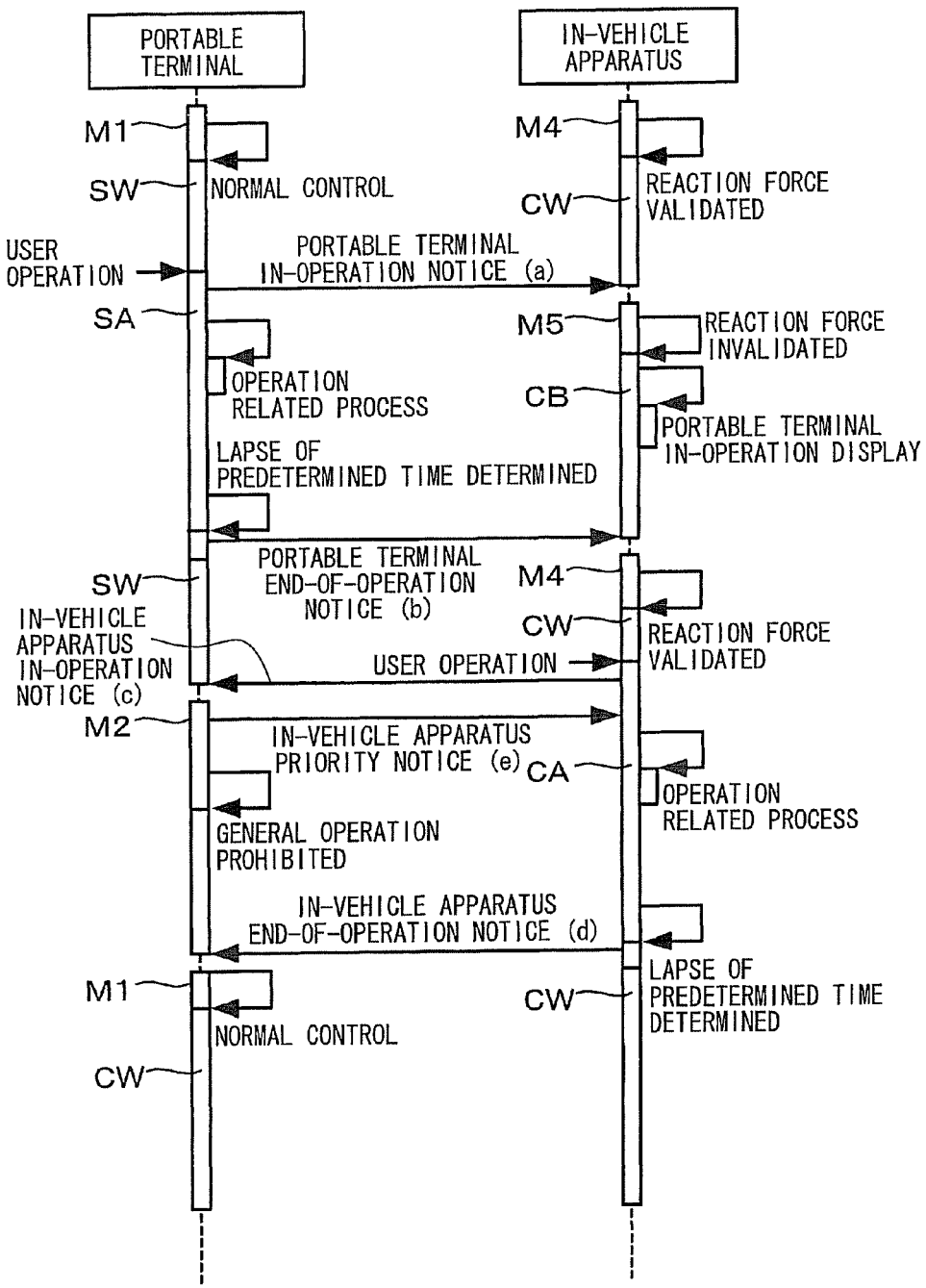

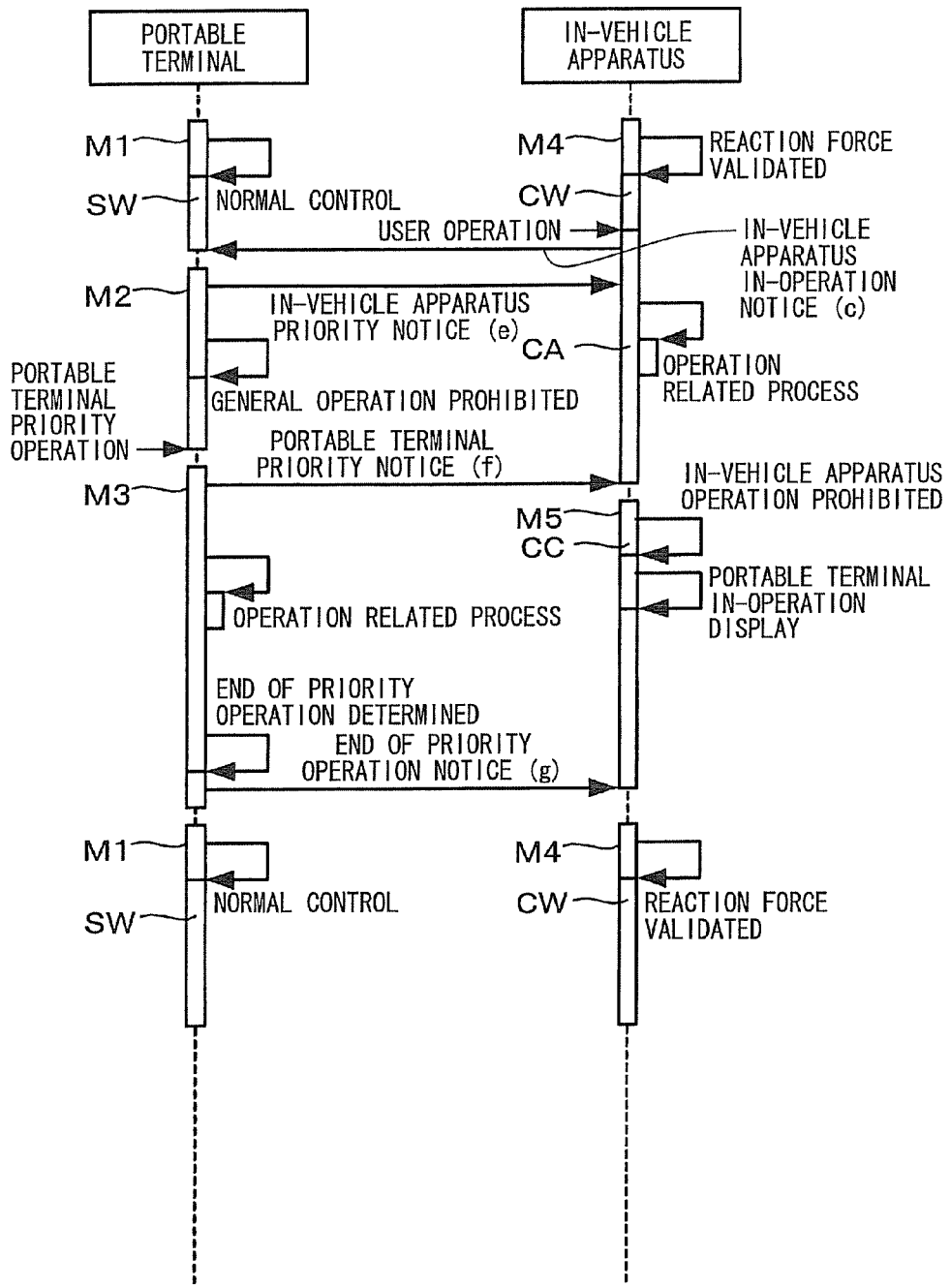

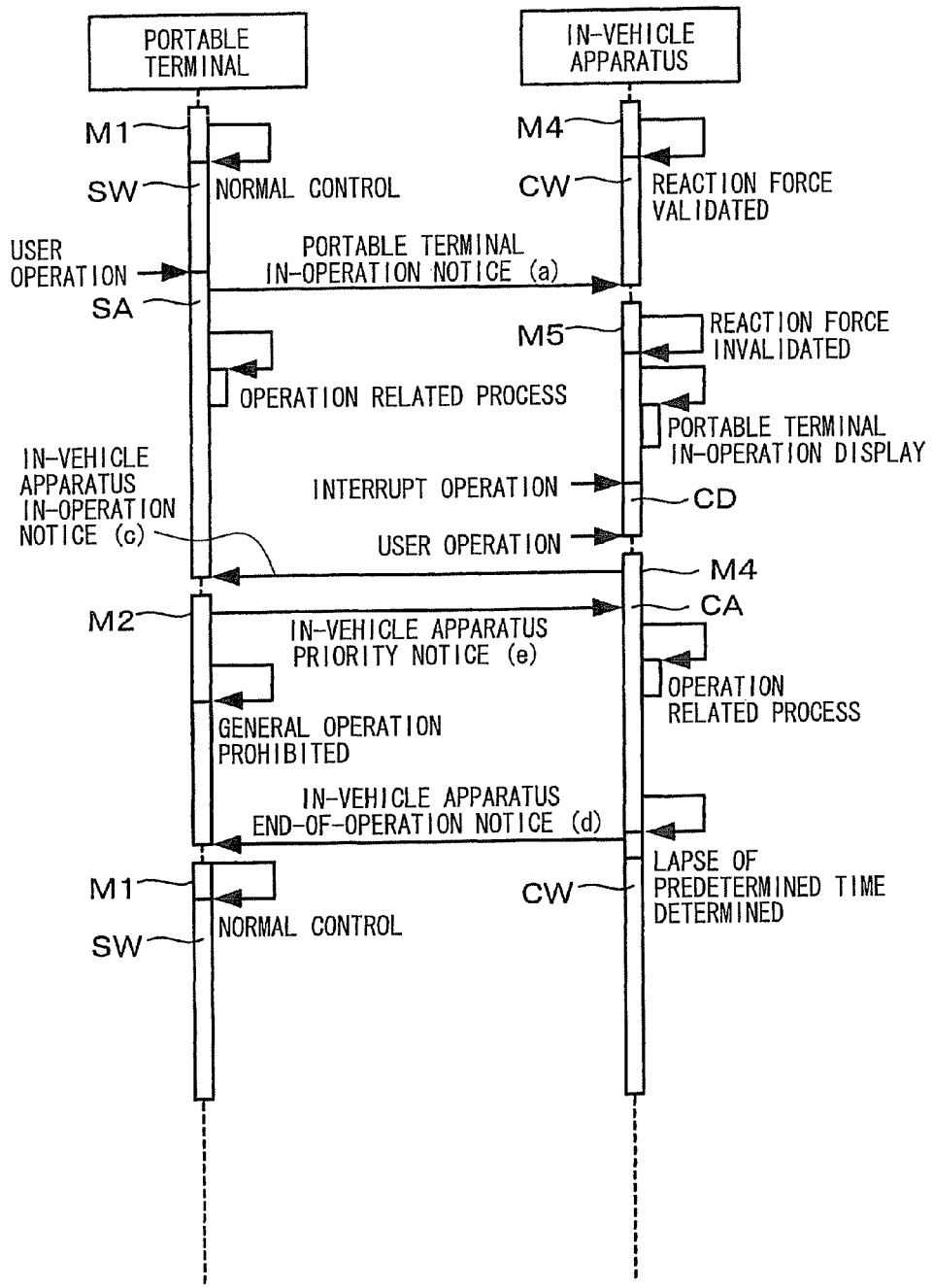

OPERATION SUPPORT SYSTEM, IN-VEHICLE APPARATUS AND PORTABLE TERMINAL

CROSS REFERENCE TO RELATED APPLICATION

The present application is based on and claims the benefit of priority of Japanese Patent Application No. 2011-34756, filed on Feb. 21, 2011, the disclosure of which is incorporated herein by reference.

TECHNICAL FIELD

The present disclosure is generally related to an operation support system used in a vehicle, by providing an operation support for a user when a portable terminal screen image is transferred and displayed on an in-vehicle apparatus.

BACKGROUND

Conventionally, a screen of a display device disposed in a vehicle can be used to control or operate an in-vehicle device, such as a navigation system, an air-conditioning device, an audio device, and the like. For example, the screen of the display device may be a liquid crystal display on a console of the vehicle. By displaying an image of a button or a knob that controls an in-vehicle device, such as the air-conditioning, a user of the vehicle may operate or control the in-vehicle device by performing an operation on the button.

In such a technique, the in-vehicle screen is preferably positioned at a high position on the console farther from a driver, for the purpose of minimizing a viewpoint movement of the driver. On the other hand, for the ease of operation, an operation unit for operating such in-vehicle screen is preferably positioned closer to the driver in the vehicle, such as at a position just beside the driver's hand.

Therefore, for accommodating the above-described needs, a remote operation system that has the operation unit separately positioned away from the screen is already realized. Such system has, in some case, a one-to-one correspondence between a movable area of an operation knob and a display area of the in-vehicle screen (i.e., known as absolute operation), for improving the operability of the knob. In other words, a cursor moved under control of the operation knob is moved to an operated position in the in-vehicle screen corresponding to the user's operation on the operation knob, to indicate an intended position of the in-vehicle screen. In the course of displaying the cursor on the in-vehicle screen, a reaction force (i.e., a resistance force or an assisting force) is applied to the operation knob according to the contents of the in-vehicle screen, and the user operation on the operation knob is supported and facilitated through tactile sensation, for the improvement of the operability.

For example, a known technique uses an assisting reaction force applied to the operation knob to guide the cursor to a selection item image when the cursor is moved closer to the selection item image. Further, Japanese Patent Laid-Open No. 2008-108062 (JP '062) proposes a technique to shift a focus of the assisting reaction force away from a center of the selection item image by a predetermined amount of time, for the purpose of diminishing an operation incongruity. In both cases, such a technique uses reaction force information, which is prepared as a reaction force map for controlling the assisting reaction force applied to the operation knob to be consistent with the positions of the selection item image, and the assisting reaction force on the operation knob is controlled with reference to such reaction force information.

Further, the word "cursor" may represent any operation position indicator displayed on the screen, pointing a subject of the operation or indicating an operation position. In the following, a term operation position indicating symbol is used to represent, more collectively, the cursor.

Further, in recent years, a portable terminal is equipped with more high-level functionality, such as a smart phone, that has a global positioning system (GPS) receiver function is capable of serving as a navigation apparatus by providing route guidance. Therefore, when such portable terminal is used in a vehicle, the screen of the display device may be a preferable interface for controlling the portable terminal. That is, use of the screen improves the operability of the portable terminal, because the in-vehicle screen enables a control operation of the portable terminal through the operation unit of an in-vehicle apparatus, by allowing the user to operate the operation unit while watching the image on the in-vehicle screen. More practically, for example, when the portable terminal is coupled to the in-vehicle apparatus, such as a navigation apparatus in a terminal mode, a screen of the portable terminal (i.e., a terminal screen hereinafter) may be transferred to the in-vehicle apparatus and may be displayed on the in-vehicle screen.

In the terminal mode, the operation on the terminal screen is validated even when the portable terminal is coupled to the in-vehicle apparatus. In such manner, a scroll operation performed by a co-occupant of the vehicle other than the driver, e.g., a passenger, through the terminal screen is enabled, thereby decreasing the operation load of the driver.

However, in the above-described configuration of absolute operation that applies the reaction force to the operation knob, the following situation may arise which may be problematic. That is, when the scroll operation is performed through the terminal screen in a condition that the operation position indicating symbol is drawn to an inside of the selection item image, the operation position indicating symbol displayed on the in-vehicle screen is moved along with the movement of the selection item image (i.e., movement of a reaction force map), thereby causing an interference with the operation of the operation knob, that is, a scroll-induced co-movement of the operation position indicating symbol. That is, the operation of the driver is ultimately disturbed by such scrolling through the terminal screen performed by the co-occupant of the vehicle.

SUMMARY

In view of the above and other problems, the present disclosure provides an operation support system which prevents a disturbance to an operation of the in-vehicle apparatus even when an operation is performed on a screen of the portable terminal.

In an aspect of the present disclosure, the operation support system includes a portable terminal and an in-vehicle apparatus, and the in-vehicle apparatus displays on an in-vehicle screen installed in a vehicle a portable terminal screen image that is also displayed on a display screen of the portable terminal. When the portable terminal screen image is displayed on the in-vehicle screen, such display is enabled through data communication between the portable terminal and the in-vehicle apparatus.

The portable terminal may be embodied as a cellular phone such as a smart phone or the like. The portable terminal may also be realized as a personal digital assistant, i.e., a PDA. On the other hand, the in-vehicle apparatus may be embodied as a navigation device.

The in-vehicle apparatus includes an operation unit. The operation unit has an operation knob which is movable according to an operation by the user. Thus, the user is enabled to select, on the in-vehicle screen, a selection item image by using an operation position indicating symbol, which is controlled by the operation knob. Further, in the operation unit, a reaction force generation unit applies a reaction force to the user operation on the operation knob according to predetermined reaction force information.

Particularly in the present disclosure, when the operation on the terminal screen is performed in a portable terminal normal mode, in which the operation on the portable terminal is allowed, a portable terminal in-operation notice is sent out from the portable terminal to the in-vehicle apparatus, indicating that the portable terminal is being operated. On the other hand, if the in-vehicle apparatus receives the portable terminal in-operation notice from the portable terminal in an in-vehicle apparatus normal mode, which allows the operation of the in-vehicle apparatus, the in-vehicle apparatus shifts from the in-vehicle apparatus normal mode to a portable terminal in-operation mode, and invalidates the reaction force generated by the reaction force generation unit. The invalidation of the reaction force means non-generation of the reaction force according to the reaction force information. More practically, as an example of such invalidation of the reaction force, the reaction force information may newly be set. Alternatively, a motor/actuator operation based on the reaction force information may temporarily be restricted.

In such manner, the operation position indicating symbol displayed on the in-vehicle screen is prevented from moving along with the movement of the selection item image, even when the scroll operation is performed on the terminal screen in a condition that the operation position indicating symbol is being drawn into an inside of the selection item image. As a result, even when an operation such as the scroll of the screen image is performed on the portable terminal, disturbance of the operation on the in-vehicle apparatus is prevented.

Further, it may be convenient for the user who is going to operate the in-vehicle apparatus to know that the portable terminal is currently being operated. Therefore, in addition to the above configuration, the in-vehicle apparatus may display on the in-vehicle screen that the portable terminal is being operated when the in-vehicle apparatus shifts to the portable terminal in-operation mode. In such manner, the user, who is going to operate the in-vehicle apparatus, understands that the portable terminal is currently being operated, thereby improving the operability of the in-vehicle apparatus.

Further, when the portable terminal determines that there is no operation on the terminal screen, the portable terminal sends out to the in-vehicle apparatus a portable terminal end-of-operation notice to indicate the end of the operation on the portable terminal. For example, when a predetermined time has lapsed without the operation performed on the terminal screen of the portable terminal, the portable terminal sends out the portable terminal end-of-operation notice. In such case, after receiving the portable terminal end-of-operation notice from the portable terminal, the in-vehicle apparatus returns to the in-vehicle apparatus normal mode, and validates the reaction force by the reaction force generation unit. In such manner, the reaction force is immediately validated after the end of the operation on the portable terminal, thereby preventing the disturbance of the user operation performed on the in-vehicle apparatus.

Further, contrary to the above, when the in-vehicle apparatus receives the operation on the operation unit in the in-vehicle apparatus normal mode, the in-vehicle apparatus sends out to the portable terminal an in-vehicle apparatus in-operation notice that indicates that the in-vehicle apparatus is being operated. In response, when receiving such notice from the in-vehicle apparatus in the portable terminal normal mode, the portable terminal shifts to an in-vehicle apparatus priority mode, and prohibits the operation on the terminal screen. In such manner, when the operation unit of the in-vehicle apparatus is operated, the operation on the terminal screen is prohibited, thereby preventing the disturbance of the operation on the in-vehicle apparatus.

Further, after shifting to the in-vehicle apparatus priority mode, the portable terminal may send out to the in-vehicle apparatus an in-vehicle apparatus priority notice that indicates that the operation on the in-vehicle apparatus is prioritized. In such manner, the user on the in-vehicle apparatus side understands that the operation on the in-vehicle apparatus is prioritized.

Further, similar to the portable terminal, when the in-vehicle apparatus determines that there is no operation on the operation unit, the in-vehicle apparatus sends out to the portable terminal an in-vehicle apparatus end-of-operation notice to indicate the end of the operation on the in-vehicle apparatus. For example, when a predetermined time has lapsed without the operation performed on the operation unit, the in-vehicle apparatus sends out the in-vehicle apparatus end-of-operation notice. In such case, after receiving the in-vehicle apparatus end-of-operation notice from the in-vehicle apparatus, the portable terminal returns to the portable terminal normal mode, and allows the operation on the terminal screen. In such manner, the operation on the portable terminal is immediately allowed after the end of the operation on the in-vehicle apparatus.

Further, though the operation on the portable terminal is prohibited in the in-vehicle apparatus priority mode, high priority operation of the portable terminal may preferably be allowed. Therefore, the portable terminal may shift to a portable terminal priority mode to give priority to a certain operation on the portable terminal, when a predetermined operation on the terminal screen is performed in the in-vehicle apparatus priority mode, and may send out to the in-vehicle apparatus a portable terminal priority notice. In such case, after receiving the portable terminal priority notice from the portable terminal, the in-vehicle apparatus may shift from the in-vehicle apparatus priority mode to the portable terminal in-operation mode, and may prohibit the operation on the operation unit. In such manner, the convenience of the operator of the portable terminal is improved.

Further, in the above-described configuration, the in-vehicle apparatus in the portable terminal in-operation mode may display on the in-vehicle screen that the portable terminal is being operated. In such manner, the user who is going to operate the in-vehicle apparatus understands that a specific operation is being performed on the portable terminal, thereby improving the operability of the in-vehicle apparatus.

Further, regarding such a specific operation, the portable terminal may send out to the in-vehicle apparatus a specific operation end notice that indicates the end of the specific operation when the portable terminal determines the end of the specific operation on the terminal screen. In such case, after receiving the specific operation end notice from the portable terminal, the in-vehicle apparatus shifts from the portable terminal in-operation mode to the in-vehicle apparatus normal mode, and validates the reaction force generated by the reaction force generation unit. In such manner, the reaction force is immediately validated after the end of the specific operation on the portable terminal, and the disturbance of the user operation on the in-vehicle apparatus is prevented.

Further, though the operation of the in-vehicle apparatus is prohibited in the portable terminal in-operation mode, there may be a case that the operation of the in-vehicle apparatus is required during such time. Therefore, when an interrupt operation is performed on the operation unit of the in-vehicle apparatus in the portable terminal in-operation mode, the in-vehicle apparatus returns to the in-vehicle apparatus normal mode, and the in-vehicle apparatus sends out to the portable terminal the in-vehicle apparatus in-operation notice. In such case, similar to the above configuration, the portable terminal shifts from the portable terminal normal mode to the in-vehicle apparatus priority mode, and prohibits the operation on the terminal screen. In such manner, the operation on the in-vehicle apparatus is prioritized by recognizing the interruption operation, thereby preventing the disturbance of the user operation on the in-vehicle apparatus.

Such in-vehicle apparatus and portable terminal may further employ the above-described various configurations of the operation support system.

BRIEF DESCRIPTION OF THE DRAWINGS

Objects, features, and advantages of the present disclosure will become more apparent from the following detailed description made with reference to the accompanying drawings, in which:

FIG. 6 is a flowchart of a basic process of the in-vehicle apparatus and the portable terminal of the present disclosure;

FIG. 7 is a flowchart of a process of a specific operation of the portable terminal of the present disclosure; and FIG. 8 is a flowchart of a process of an interrupt operation of the in-vehicle apparatus of the present disclosure.

DETAILED DESCRIPTION

An embodiment of the present disclosure is described with reference to the drawings.

Figure 1:
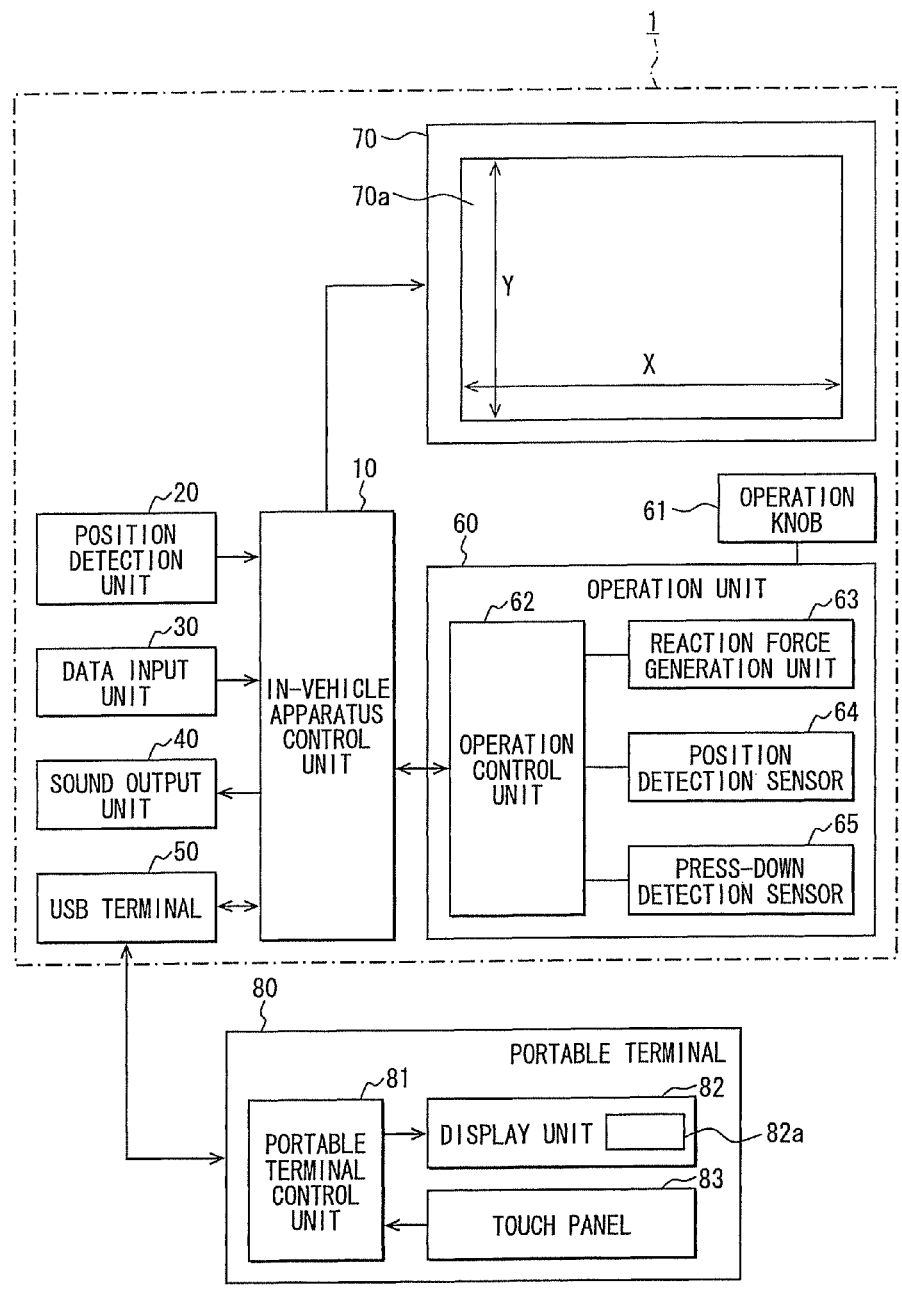
FIG. 1 is a block diagram of an operation support system of the present disclosure.

FIG. 1 is a block diagram of an operation support system in the embodiment. The operation support system includes an in-vehicle apparatus 1 and a portable terminal 80.

The in-vehicle apparatus 1 is disposed in a vehicle and is used to control and operate various vehicle devices, such as a navigation system, audio system, climate control system, and the like. The in-vehicle apparatus 1 includes an in-vehicle apparatus control unit 10. The in-vehicle apparatus control unit 10 has a well-known computer having a CPU, a ROM, a RAM, an input/output (I/O), a bus line for connecting those parts, together with other parts.

The in-vehicle apparatus control unit 10 is electrically coupled to a position detection unit 20, a data input unit 30, a sound output unit 40, a USB terminal 50, an operation unit 60 and a display unit 70.

The position detection unit 20 determines a current position of a vehicle. The position detection unit 20 receives a signal from a GPS satellite with a GPS receiver, and calculates the position coordinates of the vehicle based on a rotational acceleration force, determined by a gyro and a vehicle speed that is detected by a speed sensor. Signals from various sensors and receivers are used for mutual compensation of the vehicle position for the improvement of the detection accuracy.

The data input unit 30 is a device that reads various programs and data, such as map data stored in a storage medium (e.g., a DVD-ROM and a hard disk drive) for a navigation process.

The sound output unit 40 is a device to notify a user of various information through voice and sound. By providing information from the display unit 70 and from the sound output unit 40, the in-vehicle apparatus 1 is capable of providing the user with required information and guidance.

The USB terminal 50 is connectable to various devices, including the portable terminal 80, which may be a cellular phone such as a smart phone or the like. In the present embodiment, when the portable terminal 80 is coupled to the in-vehicle apparatus, the in-vehicle apparatus is put in a terminal mode. In the terminal mode, the image displayed on a screen of the portable terminal 80 is also displayed on the display unit 70 by way of the in-vehicle apparatus control unit 10.

The operation unit 60 is a pointing device, and includes an operation knob 61, an operation control unit 62, a reaction force generation unit 63, a position detection sensor 64 for detecting a position of the operation knob 61 and a press-down detection sensor 65 for detecting a press-down operation of the operation knob 61.

The display unit 70 is a color display unit having an in-vehicle screen 70a that is made of, for example, a liquid crystal display or the like, for the display of various images according to an image signal input from the in-vehicle apparatus control unit 10.

The arrangement of the operation unit 60 and the display unit 70 is described in the following.

Figure 2A:
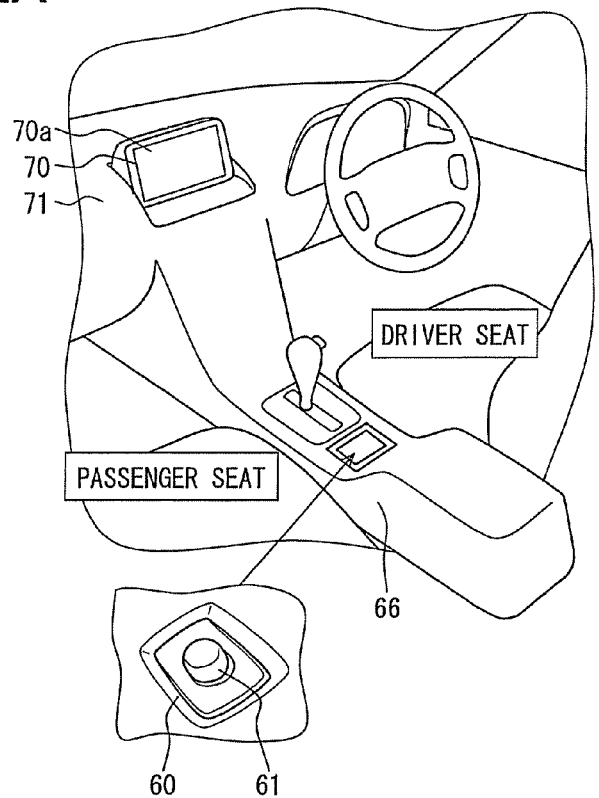
FIG. 2A is an illustration of a display unit and an operation unit in a vehicle compartment of the present disclosure.

As shown in FIG. 2A, the display unit 70 is disposed on a dashboard 71 in front of the driver, at a middle position between the driver and the passenger to decrease the movement of the driver's viewpoint for viewing the in-vehicle screen 70a of the display unit 70. The operation unit 60 is arranged on an upper face of a center console 66 just next to the driver's seat for the ease of operation, within an easily reachable range from the driver, who may be able to reach the operation unit 60 without changing his/her posture or without extending the arm.

Figure 2B:
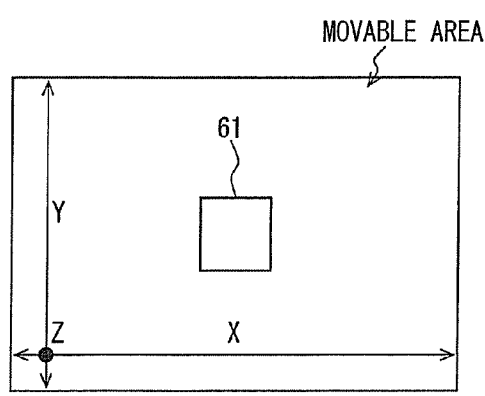
FIG. 2B is an illustration of a movable area of an operation knob of the present disclosure.

An operation knob 61 of the operation unit 60 is a two-dimensional sliding knob and moves in a two-dimensional surface. In FIG. 2B, the movable area of the operation knob 61 is seen from a top view. The operation knob 61 moves on a surface that is perpendicular to a shaft of the knob 61, along an X axis and a Y axis. The movable area of the operation knob 61 is a rectangular area having the same aspect ratio as the in-vehicle screen 70a in FIG. 1. Further, the operation knob 61 is also movable along a Z axis in FIG. 2B (i.e., a vertical direction against the drawing surface), to enable a determination operation in the in-vehicle screen 70a.

The operation control unit 62 detects a position of the operation knob 61 along the X axis and the Y axis based on a signal from the position detection sensor 64. Further, based on a signal from the press-down detection sensor 65, it detects the press-down operation, namely the determination operation by using the operation knob 61. Furthermore, the operation control unit 62 controls the reaction force generation unit 63 based on predetermined reaction force information.

The operation control unit 62 outputs a position in the movable area of the operation knob 61 to the in-vehicle apparatus control unit 10 as operation data. In such output, the operation control unit 62 associates a position of the operation knob 61 in the movable area and a position (i.e., a cursor position) in the in-vehicle screen 70a in a one-to-one manner. Therefore, the in-vehicle apparatus control unit 10 displays, based on the operation data, a cursor at a position corresponding to the position of the operation knob 16 in the movable area, with the entire area of the in-vehicle screen 70a associated with the movable area of the operation knob 61 (i.e., so-called "absolute operation").

Further, the operation control unit 62 outputs the press-down operation of the operation knob 61 to the in-vehicle apparatus control unit 10 as operation data. Based on the output of the operation data, the in-vehicle apparatus control unit 10 determines that a determination operation is performed at the cursor position.

Furthermore, the operation control unit 62 receives the reaction force information from the in-vehicle apparatus control unit 10, which defines a reaction force map. According to the reaction force map, the operation control unit 62 applies to the operation knob 61 the reaction force defined by the reaction force information through the reaction force generation unit 63.

The reaction force information is described in the following.

The reaction force information is, for example, a data table in a matrix form associated with the coordinates of the movable area of the operation knob 61, in a one-to-one manner.

Figure 3A:
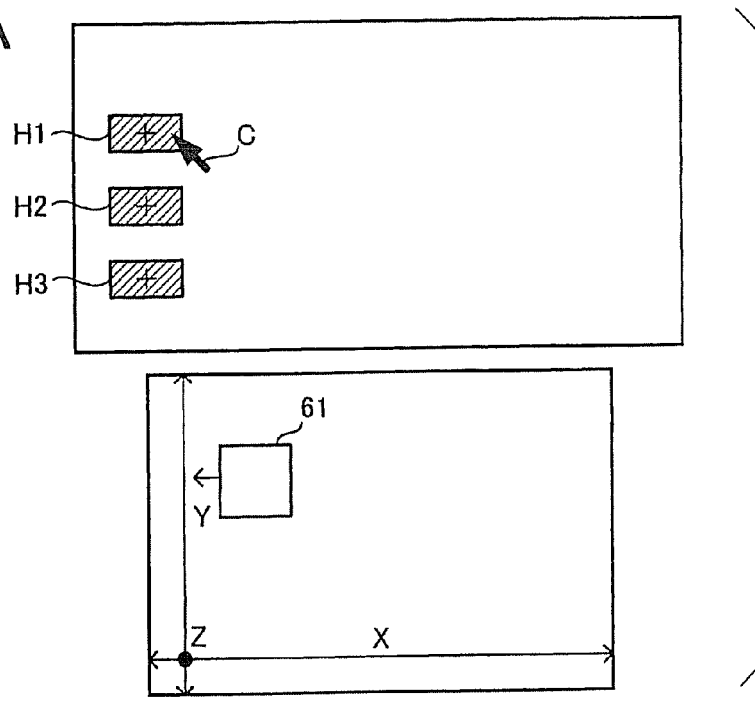
FIG. 3A is an illustration of a reaction force map of the present disclosure.
Figure 3B:
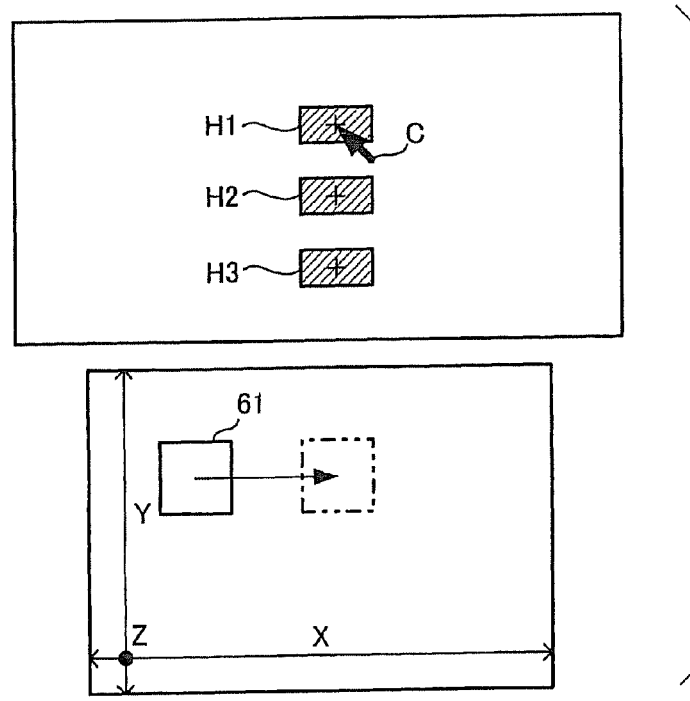
FIG. 3B is an illustration of a position of the operation knob in the movable area of the present disclosure.

For example, FIG. 3A is a illustration of the reaction force map defined in the reaction force information that is set by the in-vehicle apparatus control unit 10, and FIG. 3B is a illustration of the position of the operation knob 61 corresponding to the cursor position. Drawing reaction force generation areas H1, H2, H3 (i.e., hatching areas) in FIGS. 3A and 3B are button areas, where the drawing reaction force is applied to the operation of the operation knob 61.

The reaction force information, defined as the reaction force map in FIGS. 3A and 3B, applies an assisting force to the operation knob 61 toward a plus sign ("+") at the center of areas H1, H2, H3 when a cursor C is within one of those areas. In such manner, the user operation for selecting one of those buttons by using the cursor C is facilitated.

The portable terminal 80 in FIG. 1 includes a portable terminal control unit 81 as a main component. The portable terminal control unit 81 is embodied as a so-called computer system, and is connected to a display unit 82 and a touch panel 83. The display unit 82 includes a terminal screen 82a. The touch panel 83 is formed with the terminal screen 82a in one body, and allows a touch operation of a finger by employing the electro-static touch detection method.

When the portable terminal 80 is coupled to the USB terminal 50 of the in-vehicle apparatus 1 in the terminal mode, and an image of the terminal screen 82a of the display unit 82 of the portable terminal 80 is displayed on the in-vehicle screen 70a of the display unit 70 by way of the in-vehicle control unit 10.

In the terminal mode, the portable terminal 80 is operated by an operation on the in-vehicle screen 70a through the operation unit 60. In other words, when the determination operation is performed by the operation knob 61, the operation control unit 62 outputs the operation data that indicates the determination operation to in-vehicle apparatus control unit 10, and the in-vehicle apparatus control unit 10 outputs to the portable terminal 80 information regarding the determination operation based on such operation data. Further, in the terminal mode, the operation on the terminal screen 82a is also enabled, and, when a scroll operation is performed on the terminal screen 82a, such scroll operation on the terminal screen 82a is reflected to the in-vehicle screen 70a.

When the cursor C is positioned within the reaction force generation area H1 as shown in FIG. 3A, the terminal screen 82a of the portable terminal 80 may be scrolled by the user in the right direction. In such case, as shown in FIG. 3B, the reaction force generation areas H1 to H3 are scrolled toward right altogether, thus the cursor C is moved to the right side together with the area H1. If such operation is performed by the passenger in the vehicle, for example, the operation knob 61 is also moved in the right direction, thereby possibly disturbing the operation of the operation unit 60 by the driver of the vehicle.

Therefore, the operation of the in-vehicle apparatus 1 is configured not to be disturbed by the operation of the portable terminal 80, by devising state transitions and mode changes.

Figure 4:
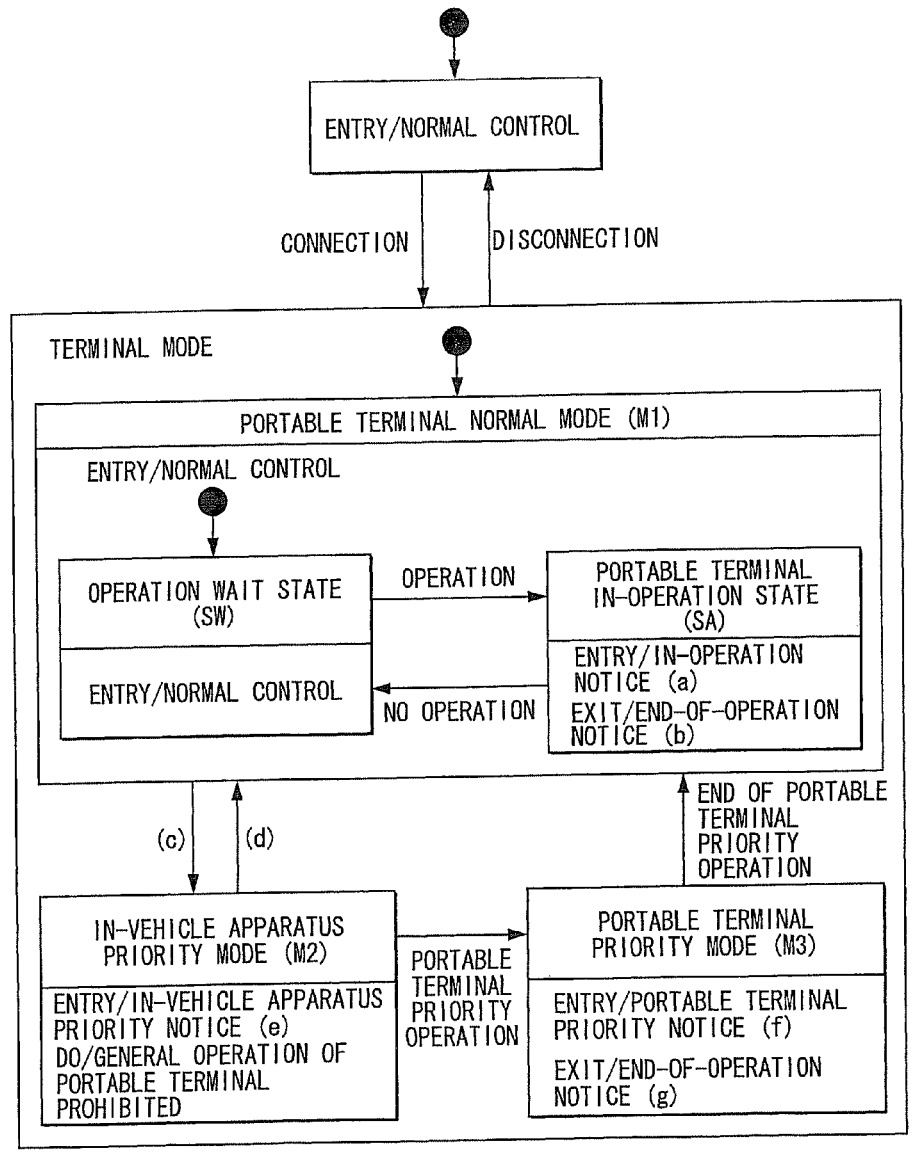
FIG. 4 is an illustration of a state transition of a portable terminal of the present disclosure.
Figure 5:
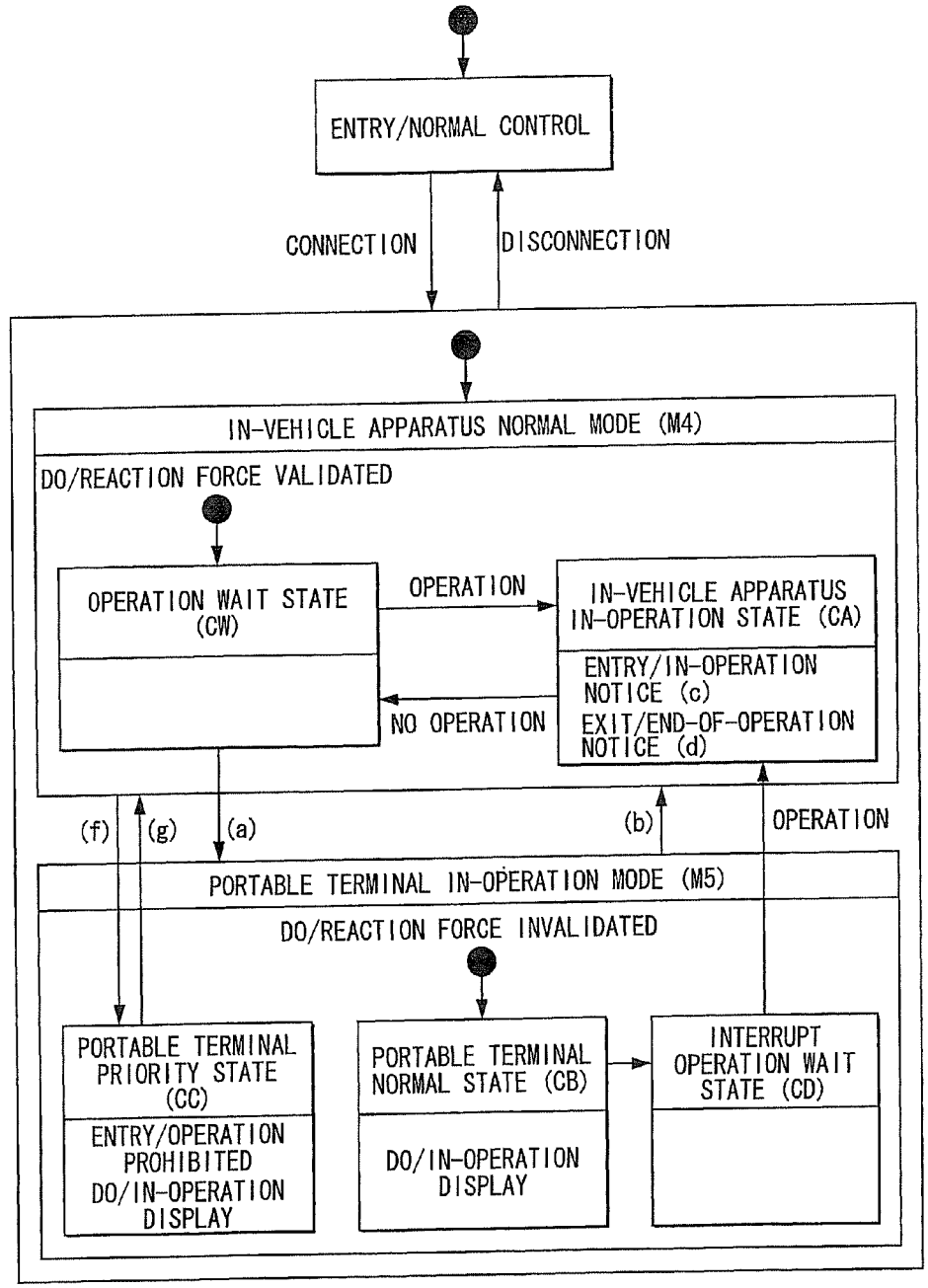
FIG. 5 is an illustration of a state transition of an in-vehicle apparatus of the present disclosure.

FIG. 4 is an illustration of state transitions of the portable terminal 80, and FIG. 5 is an illustration of state transition of the in-vehicle apparatus 1. When the power supply is turned on for the portable terminal 80 and the portable terminal 80 is not coupled to the in-vehicle apparatus 1, the portable terminal 80 starts a normal control from a black dot mark in an upper part of FIG. 4. The in-vehicle apparatus 1 starts a normal control from a black dot mark in an upper part of FIG. 5 when the power supply is turned on for the in-vehicle apparatus 1 and the in-vehicle apparatus 1 is not coupled to the portable terminal 80.

When the portable terminal 80 is coupled to the in-vehicle apparatus 1, various mode changes are performed in the terminal mode. The portable terminal 80 has three modes: a portable terminal normal mode (M1), an in-vehicle apparatus priority mode (M2), and a portable terminal priority mode (M3). The in-vehicle apparatus 1 has two modes: an in-vehicle apparatus normal mode (M4) and a portable terminal in-operation mode (M5).

In the following, the mode changes between the above-described various modes and state transitions in the same mode are described with reference to FIGS. 6 to 8. Mode changes in the in-vehicle apparatus 1 are controlled by the in-vehicle apparatus control unit 10, and mode change in the portable terminal 80 are controlled by the portable terminal control unit 81. However, for the brevity of the description, the in-vehicle apparatus 1 and the portable terminal 80 are used as the subject of such mode change controls in the following description.

The description of FIG. 6 is associated with the state transitions in FIGS. 4 and 5, thus should be readily understood with reference to FIGS. 4 to 5.

When the portable terminal 80 is coupled to the in-vehicle apparatus 1, the portable terminal 80 is put in a portable terminal normal mode (M1) and the in-vehicle apparatus 1 is put in an in-vehicle apparatus normal mode (M4). In the portable terminal normal mode (M1), a normal control is started, and a state transits to an operation wait state (SW) (cf. FIG. 4). In the in-vehicle apparatus normal mode (M4), the reaction force by the reaction force generation unit 63 is validated, and a state transits to an operation wait state (CW) (cf. FIG. 5). Further, a validation and an invalidation of the reaction force are performed by controlling the reaction force generation unit 63. For example, if the reaction force generation unit 63 is a motor, the validation and the invalidation of the reaction force may be performed as turning on/off of the signal output to the motor.

Assuming that the user's operation is performed through the terminal screen 82a of the portable terminal 80, the portable terminal 80 transits to a portable terminal in-operation state (SA) in the portable terminal normal mode (M1) (cf. FIG. 4). The portable terminal 80 in the portable terminal in-operation state (SA) sends out to the in-vehicle apparatus 1a portable terminal in-operation notice (a), which indicates that the portable terminal 80 is being operated. In response, the in-vehicle apparatus 1 shifts to the portable terminal in-operation mode (M5), and invalidates the reaction force by the reaction force generation unit 63, and transits to a portable terminal normal state (CB). In the portable terminal normal state (CB), the in-vehicle apparatus 1 displays on the in-vehicle screen 70a that the portable terminal 80 is being operated. Then, the portable terminal 80 determines, as shown in FIG. 6, lapse of a predetermined time of no operation, and sends out to the in-vehicle apparatus 1a portable terminal end-of-operation notice (b), and transits to the operation wait state (SW) (cf. FIG. 4). Upon receiving such portable terminal end-of-operation notice (b), the in-vehicle apparatus 1 returns to the in-vehicle apparatus normal mode (M4), and validates the reaction force by the reaction, force generation unit 63, and transits to the operation wait state (CW) (cf. FIG. 5).

Then, assuming that the user's operation is performed through the operation unit 60 of the in-vehicle apparatus 1, the in-vehicle apparatus 1 transits to an in-vehicle apparatus in-operation state (CA) in the in-vehicle apparatus normal mode (M4) (cf. FIG. 5). In the in-vehicle apparatus in-operation state (CA), the in-vehicle apparatus 1 sends out to the portable terminal 80 an in-vehicle apparatus in-operation notice (c), which indicates that the in-vehicle apparatus 1 is being operated. In response, the portable terminal 80 shifts to the in-vehicle apparatus priority mode (M2), and sends out an in-vehicle apparatus priority notice (e), and prohibits general operations of the portable terminal (cf. FIG. 4). Then, as shown in FIG. 6, the in-vehicle apparatus 1 determines lapse of a predetermined time of no operation, and sends out an in-vehicle apparatus end-of-operation notice (d), and transits to the operation wait state (CW). Upon receiving the in-vehicle apparatus end-of-operation notice (d), the portable terminal 80 returns to the portable terminal normal mode (M1), and the portable terminal 80 starts a normal control, and transits to the operation wait state (SW).

Now, with reference to the illustration in FIG. 7, a portable terminal priority operation is described as a "specific operation" through the terminal screen 82a of the portable terminal 80. The following description is based on an assumption that the portable terminal 80 is in the in-vehicle apparatus priority mode (M2). In other words, upon receiving the operation on the operation unit 60 of the in-vehicle apparatus 1, the in-vehicle apparatus 1 sends out the in-vehicle apparatus in-operation notice (c) to the portable terminal 80 as shown in FIG. 7, and the portable terminal 80 shifts to the in-vehicle apparatus priority mode (M2), and general operations of the portable terminal are prohibited.

When the portable terminal priority operation is performed and the portable terminal sends out a portable terminal priority notice (f) to the in-vehicle apparatus 1, the portable terminal 80 then shifts to the portable terminal priority mode (M3) (cf. FIG. 4). In such manner, the in-vehicle, apparatus 1 transits to the portable terminal priority state (CC) in the portable terminal priority mode (M5) (cf. FIG. 5). In the portable terminal priority state (CC), the operation on the operation unit 60 of the in-vehicle apparatus 1 is prohibited, and the in-vehicle apparatus 1 displays on the in-vehicle screen 70a that the portable terminal 80 is being operated. Then, the portable terminal 80 performs an end of priority operation determination, and the portable terminal 80 sends out to the in-vehicle apparatus 1 an end of priority operation notice (g), and shifts to a portable terminal normal mode (M1), and starts a normal control, and transits to the operation wait state (SW) (cf. FIG. 4). On the other hand, the in-vehicle apparatus 1 shifts to the in-vehicle apparatus normal mode (M4) upon receiving the end of priority operation notice (g) from the portable terminal 80, and transits to the operation wait state (CW) (cf. FIG. 5).

Now, with reference to the illustration in FIG. 8, "an interrupt operation" of the in-vehicle apparatus 1 is described. The in-vehicle apparatus 1 is assumed to be put in a portable terminal normal state (CB) of the portable terminal in-operation mode (M5). In other words, upon receiving the user operation on the terminal screen 82a of the portable terminal 80, the portable terminal 80 sends out the portable terminal in-operation notice (a) to the in-vehicle apparatus 1 as shown in FIG. 8, and the in-vehicle apparatus 1 shifts to the portable terminal in-operation mode (M5), and the in-vehicle apparatus 1 displays that the portable terminal 80 is being operated.

Upon receiving an interrupt operation, the in-vehicle apparatus 1 transits to an interrupt operation wait state (CD) in the portable terminal in-operation mode (M5) (cf. FIG. 5). The interrupt operation is, for example, a predetermined operation of the operation knob 62 or an input from the other device. When the user operation is performed in the interrupt operation wait state (CD), the in-vehicle apparatus 1 returns to the in-vehicle apparatus normal mode (M4), and transits to the in-vehicle apparatus in-operation state (CA) (cf. FIG. 5). In the in-vehicle apparatus in-operation state (CA), the in-vehicle apparatus in-operation notice (c) is sent out to the portable terminal 80. Upon receiving the in-vehicle apparatus in-operation notice (c), the portable terminal 80 shifts to the in-vehicle apparatus priority mode (M2), and sends out to the in-vehicle apparatus 1 the in-vehicle apparatus priority notice (e), and prohibits general operations of the portable terminal (cf. FIG. 4).

The advantageous effects of the operation support system in the present embodiment are described in the following.

In the present embodiment, as shown in FIG. 6, when the user operation on the terminal screen 82a of the portable terminal 80 is performed, the portable terminal 80 transits to the portable terminal in-operation state (SA) in the portable terminal normal mode (M1) (cf. FIG. 4). In the portable terminal in-operation state (SA), the portable terminal 80 sends out the portable terminal in-operation notice (a) to the in-vehicle apparatus 1, which indicates that the portable terminal 80 is being operated. In response, the in-vehicle apparatus 1 shifts to the portable terminal in-operation mode (M5), and invalidates the reaction force by the reaction force generation unit 63, and transits to the portable terminal normal state (CB) (cf. FIG. 5). In such manner, even when the scroll operation is performed on the terminal screen 82a while the cursor C is having the reaction force drawing it into the drawing reaction force generation area H1, for example, the cursor C displayed on the in-vehicle screen 70a does not move together with the scroll movement of the buttons. As a result, even when such operation as scroll operation is performed on the terminal screen 82a, disturbance of the user operation on the in-vehicle apparatus 1 is prevented.

Further, in the portable terminal normal state (CB), the in-vehicle screen 70a displays that the portable terminal 80 is being operated (cf. FIG. 5). Therefore, the user who is going to operate the in-vehicle apparatus 1 understands that the portable terminal 80 is currently being operated, thereby improving the usability of the in-vehicle apparatus 1.

Furthermore, as shown in FIG. 6, the portable terminal 80 outputs the end-of-operation notice (b) when it determines lapse of a predetermined period of time of no user operation, and transits to the operation wait state (SW) (cf. FIG. 4). Upon receiving such notice (b) from the portable terminal 80, the in-vehicle apparatus 1 returns to the in-vehicle apparatus normal mode (M4), validates the reaction force by the reaction force generation unit 63, and transits to the operation wait state (CW). Therefore, after the end of the operation on the portable terminal 80, the reaction force is immediately validated, thereby preventing the disturbance of the user operation on the in-vehicle apparatus 1.

Further, as shown in FIG. 6, when receiving the user operation on the operation unit 60, the in-vehicle apparatus 1 in the in-vehicle apparatus normal mode (M4) transits to the in-vehicle apparatus in-operation state (CA) (cf. FIG. 5). In the in-vehicle apparatus in-operation state (CA), the in-vehicle apparatus 1 sends out to the portable terminal 80 the in-vehicle apparatus in-operation notice (c) indicating that the in-vehicle apparatus 1 is being operated. In response, the portable terminal 80 shifts to the in-vehicle apparatus priority mode (M2), and prohibits the general operation of the portable terminal 80 (cf. FIG. 4). Therefore, due to the prohibition of the operation on the terminal screen 82a, disturbance of the user operation on the in-vehicle apparatus 1 is prevented when the operation on the operation unit 60 in the in-vehicle apparatus 1 is performed.

Further, when the portable terminal 80 shifts to the in-vehicle apparatus priority mode (M2), the portable terminal 80 sends out to the in-vehicle apparatus 1 the in-vehicle apparatus priority notice (e) (cf. FIG. 4). Therefore, the user of the in-vehicle apparatus 1 understands that the operation of the in-vehicle apparatus 1 is prioritized.

Furthermore, as shown in FIG. 6, the in-vehicle apparatus 1 outputs the end-of-operation notice (d) when it determines lapse of a predetermined period of time of no operation, and transits to the operation wait state (CW) (cf. FIG. 5). Upon receiving such notice (d), the portable terminal 80 returns to the portable terminal normal mode (M1), and starts the normal control, and transits to the operation wait state (SW) (cf. FIG. 4). Therefore, after the end of the operation of the in-vehicle apparatus 1, the operation on the portable terminal 80 is immediately validated.

Further, as shown in FIG. 7, the portable terminal 80 shifts to the portable terminal priority mode (M3) when the portable terminal priority operation is performed in the in-vehicle apparatus priority mode (M2), and sends out to the in-vehicle apparatus 1 the portable terminal priority notice (f). In portable terminal priority mode (M3), the operation on the operation unit 60 is prohibited, and the in-vehicle apparatus 1 displays on the in-vehicle screen 70a that the portable terminal 80 is being operated. Therefore, the usability of the portable terminal 80 is improved. Further, it contributes to the improvement of the usability of the in-vehicle apparatus 1 for the user who is going to perform an operation on the in-vehicle apparatus 1, because the user watching the in-vehicle screen 70a understands that the portable terminal 80 is being operated based on the display on the in-vehicle screen 70a regarding the in-operation state of the portable terminal 80.

Further, as shown in FIG. 7, the portable terminal 80 determines the end of the priority operation, sends out the end of priority operation notice (g) to the in-vehicle apparatus 1, shifts to the portable terminal normal mode (M1), and starts the normal control, and transits to the operation wait state (SW) (cf. FIG. 4). On the other hand, the in-vehicle apparatus 1 shifts to the in-vehicle apparatus normal mode (M4), and validates the reaction force by the reaction force generation unit 63, and transits to the operation wait state (CW) (cf. FIG. 5), upon receiving the end of priority operation notice (g) from the portable terminal 80. Therefore, after the end of the priority operation on the portable terminal 80, the reaction force on the in-vehicle apparatus 1 is immediately validated, thereby preventing the disturbance of the user operation on the in-vehicle apparatus 1.

Furthermore, as shown in FIG. 8, the in-vehicle apparatus 1 receiving the interrupt operation in the portable terminal in-operation mode (M5) transits to the interrupt operation wait state (CD). When the user operation is performed in the interrupt operation wait state (CD), the in-vehicle apparatus 1 returns to the in-vehicle apparatus normal mode (M4), and transits to the in-vehicle apparatus in-operation state (CA) (cf. FIG. 5). In the in-vehicle apparatus in-operation state (CA), the in-vehicle apparatus in-operation notice (c) is sent out to the portable terminal 80, as described above. At the same time, the portable terminal 80 shifts to the in-vehicle apparatus priority mode (M2), and sends out the in-vehicle apparatus priority notice (e) to the in-vehicle apparatus 1, and prohibits the general operation of the portable terminal (cf. FIG. 4). Therefore, when the operation on the in-vehicle apparatus 1 is required, the in-vehicle apparatus 1 can readily receive the interrupt operation, thereby preventing the disturbance of the operation on the in-vehicle apparatus 1.

Further, the in-vehicle apparatus 1 and the portable terminal 80 of the present embodiment in combination may be referred to as "an operation support system," in the claims. In addition, the cursor C may be referred to as the "an operation position indicating symbol" in claims.

The present invention is not limited to the description and the drawing of the above embodiments, but various modifications or applications are possible. For example, for the purpose of invalidation of the reaction force in the above embodiment, the reaction force generation unit 63 is controlled. However, the reaction force information may be set, that is, may be changed.

Such changes and modifications are to be understood as being within the scope of the present invention as defined by the appended claims.

What is claimed is:
1. An operation support system comprising:
a portable terminal including a terminal screen to display a portable terminal screen image; and
an in-vehicle apparatus including an in-vehicle screen on which the portable terminal screen image of the portable terminal is displayable, the in-vehicle apparatus further including an operation unit, the operation unit including an operation knob and a reaction force generation unit, wherein
the operation knob of the operation unit is operational to move an operation position indicating symbol that is displayed on the in-vehicle screen to select a selection item image displayed on the in-vehicle screen, and the reaction force generation unit generates a reaction force to the operation knob according to reaction force information,
the portable terminal provides a portable terminal in-operation notice to the in-vehicle apparatus when the portable terminal is in a portable terminal normal mode and the terminal screen is operational, when the in-vehicle apparatus is in an in-vehicle apparatus normal mode, the reaction force to the operation knob generated by the reaction force generation unit is validated, and when the in-vehicle apparatus is in the in-vehicle apparatus normal mode and receives the portable terminal in-operation notice from the portable terminal, the in-vehicle apparatus changes from the in-vehicle apparatus normal mode to a portable terminal in-operation mode and invalidates the reaction force to the operation knob generated by the reaction force generation unit while maintaining operation of the operation knob to move the operation position indicating symbol on the in-vehicle screen.

2. The operation support system of claim 1, wherein when the in-vehicle apparatus transfers to the portable terminal in-operation mode, the in-vehicle apparatus displays a message indicative of the portable terminal in-operation state on the in-vehicle screen.

3. The operation support system of claim 1, wherein when the portable terminal determines that no operation is performed on the terminal screen, the portable terminal transmits an end-of-operation notice indicating the end of the operation to the in-vehicle apparatus, and when the in-vehicle apparatus receives the portable terminal end-of-operation notice, the in-vehicle apparatus returns to the in-vehicle apparatus normal mode and validates the reaction force by the reaction force generation unit.

4. The operation support system of claim 1, wherein when the in-vehicle apparatus receives an operation on the operation unit in the in-vehicle apparatus normal mode, the in-vehicle apparatus transmits an in-vehicle apparatus in-operation notice indicating the in-vehicle apparatus is in operation to the portable terminal, and when the portable terminal receives the in-vehicle apparatus in-operation notice in the portable terminal normal mode, the portable terminal transfers to an in-vehicle apparatus priority mode and prohibits operation of the terminal screen.

5. The operation support system of claim 4, wherein when the portable terminal transfers to the in-vehicle apparatus priority mode, the portable terminal transmits an in-vehicle apparatus priority notice indicating operation of the in-vehicle apparatus is prioritized to the in-vehicle apparatus.

6. The operation support system of claim 4, wherein when the in-vehicle apparatus determines that the operation unit is not being operated, the in-vehicle apparatus transmits an in-vehicle apparatus end-of-operation notice indicating the end of the operation to the portable terminal, and when the portable terminal receives the in-vehicle apparatus end-of-operation notice, the portable terminal returns to the portable terminal normal mode and permits operation of the terminal screen.

7. The operation support system of claim 4, wherein the portable terminal transfers to a portable terminal priority mode to give priority to a specific operation when a predetermined operation is performed on the terminal screen in the in-vehicle apparatus priority mode, and transmits a portable terminal priority notice to the in-vehicle apparatus, and when the in-vehicle apparatus receives the portable terminal priority notice, the in-vehicle apparatus transfers from the in-vehicle apparatus priority mode to the portable terminal in-operation mode and prohibits operation of the operation unit.

8. The operation support system of claim 7, wherein the in-vehicle apparatus, in the portable terminal in-operation mode, displays a message indicating the portable terminal in operation on the in-vehicle screen.

9. The operation support system of claim 7, wherein the portable terminal transmits a specific operation end notice indicating an end of a specific operation to the in-vehicle apparatus, when the specific operation is complete, and when the in-vehicle apparatus receives the specific operation end notice from the portable terminal, the in-vehicle apparatus transfers from the portable terminal in-operation mode to the in-vehicle apparatus normal mode and validates the reaction force by the reaction force generation unit.

10. The operation support system of claim 1, wherein when an interrupt operation is performed on the operation unit of the in-vehicle apparatus in the portable terminal in-operation mode in which the reaction force to the operation knob is invalidated, the in-vehicle apparatus returns to the in-vehicle apparatus normal mode by validating the reaction force applied to the operation knob and transmits the in-vehicle apparatus in-operation notice to the portable terminal.

11. An in-vehicle apparatus comprising:
an in-vehicle screen displaying a portable terminal screen image on a terminal screen of a portable terminal; and
an operation unit including an operation knob and a reaction force generation unit, the operation unit is operational to move an operation position indicating symbol on the in-vehicle screen to select a selection item image displayed on the in-vehicle screen, and the reaction force generation unit generates a reaction force to the operation knob according to the reaction force information, wherein the portable terminal provides a portable terminal in-operation notice to the in-vehicle apparatus when the portable terminal in a portable terminal normal mode receives an operation via the terminal screen, when the in-vehicle apparatus is in an in-vehicle apparatus normal mode, the reaction force generated by the reaction force generation unit is validated, and when the in-vehicle apparatus is in the in-vehicle apparatus normal mode and receives the portable terminal in-operation notice from the portable terminal, the in-vehicle apparatus transfers from an in-vehicle apparatus normal mode to a portable terminal in-operation mode and invalidates the reaction force to the operation knob generated by the reaction force generation unit while maintaining operation of the operation knob to move the operation position indicating symbol on the in-vehicle screen.

12. A portable terminal comprising:
a terminal screen displaying a portable terminal screen image, wherein the portable terminal screen image is provided through data communication to an in-vehicle apparatus to be displayed on an in-vehicle screen of the in-vehicle apparatus, wherein the in-vehicle apparatus has an operation unit including an operation knob and a reaction force generation unit, the operation unit is operational to move an operation position indicating symbol displayed on the in-vehicle screen to select a selection item image displayed on the in-vehicle screen, the reaction force generation unit generates a reaction force to the operation knob according to the reaction force information based on the operation of the operation unit, the portable terminal transmits a portable terminal in-operation notice to the in-vehicle apparatus when the portable terminal is in a portable terminal normal mode and the terminal screen is in operation, when the in-vehicle apparatus is in an in-vehicle apparatus normal mode, the reaction force generated by the reaction force generation unit is validated, and when the in-vehicle apparatus is in the in-vehicle apparatus normal mode and receives the portable terminal in-operation notice from the portable terminal, the in-vehicle apparatus transfers from an in-vehicle apparatus normal mode, to a portable terminal in-operation mode and further invalidates the reaction force to the operation knob generated by the reaction force generation unit while maintaining operation of the operation knob to move the operation position indicating symbol on the in-vehicle screen.

13. The operation support system of claim 1, wherein movement of the operation position indicating symbol by the reaction force generated by the reaction force generation unit is prevented through invalidation of the reaction force.

14. The operation support system of claim 1, wherein the operation knob of the operation unit is positioned separately at a position away from the in-vehicle screen.

* * * * *